UNITED STATES PATENT OFFICE 2,414,142

MANUFACTURE OF HYDROXYLAMINE

Henry Dreyfus, London, England; Claude Bonard administrator of said Henry Dreyfus, deceased No Drawing. Application November 24, 1944, Serial No. 565,062. In Great Britain January 17, 1944

11 Claims. (Cl. 23—190)

This invention relates to the manufacture of hydroxylamine.

According to the invention hydroxylamine is made by the catalytic hydrogenation of nitrous acid.

Owing to the instability of free nitrous acid the hydrogenation is carried out in a liquid reaction medium in which the nitrous acid is produced, preferably immediately or only a short time before, or concurrently with, the hydrogenation. The production of the nitrous acid may be effected by the action of a stronger acid on a metal nitrite; for example the nitrous acid may be produced by acting on an alkali metal nitrite, e. g. sodium nitrite, with sulphuric or hydrochloric acid.

The liquid reaction medium may be either water or an organic liquid which preferably contains a certain amount of water. For example there may be mixed with an aqueous solution of sodium or another metal nitrite the equivalent quantity or excess of the stronger acid, and the solution may be brought into contact with hydrogen in the presence of a suitable catalyst as is more fully described below; alternatively the nitrite solution may be added to the acid, or the acid to the nitrite solution, as the hydrogenation proceeds. On the other hand the metal nitrite, in finely divided form, may be in solution or suspension in an organic solvent, such for example as 70–90% aqueous ethyl alcohol, and the stronger acid mixed with the solution or suspension; for instance hydrogen chloride gas may be led into the solution or suspension before or during the hydrogenation. Moreover there may also be present in the reaction medium, besides the catalyst, a substance capable of combining with the hydroxylamine as it is formed, thus reducing the likelihood of loss of hydroxylamine by further hydrogenation or any other undesired reaction, and facilitating the eventual isolation of the hydroxylamine.

As the hydrogenation catalyst it is preferred to use a metal of the platinum group, for example platinum itself, palladium, etc. Such a catalyst may be in a finely divided form, for example as platinum black, or as a colloidal suspension; thus, colloidal platinum prepared from an aqueous solution of chloroplatinic acid in the presence of a protective colloid, such for instance as gum arabic, may be employed with advantage. On the other hand the catalyst may be deposited on a suitable carrier, for example fibrous asbestos, silica gel, active charcoal, a metal oxide, such as aluminium oxide, chromic oxide, ferric oxide or the like, or a suitable insoluble metal salt, for example barium sulphate. In place of a catalyst of the platinum group other hydrogenation catalysts, e. g. highly active nickel catalysts and copper-chromium oxide catalysts, may if desired be employed.

It is preferable to carry out the hydrogenation at temperatures of the order of atmospheric, or not greatly exceeding atmospheric, for example at temperatures between about 15 and 35° C., owing to the relative instability of hydroxylamine at higher temperatures, and it is an advantage of the catalysts of the platinum group that they make it possible to effect the hydrogenation at these temperatures at a relatively high rate of reaction. The hydrogenation is preferably effected under a pressure of hydrogen substantially higher than atmospheric, for example 50 lbs., 100 lbs., 200 lbs. or more per square inch. In order to maintain the hydrogen, nitrous acid and catalyst in intimate contact, the hydrogen may be continuously bubbled into and through the reaction medium, or the reaction medium may be violently agitated in an atmosphere of hydrogen, for instance by shaking or vigorous stirring.

Various methods are available for isolating the hydroxylamine produced, and the most suitable method in any instance will depend upon the particular method adopted for the hydrogenation. For example, if the hydrogenation is effected in a relatively concentrated, e. g. 70–90%, aqueous ethel alcohol in the presence of excess hydrogen chloride, hydroxylamine hydrochloride is formed, and dissolves in the ethyl alcohol, while the sodium chloride or other metal chloride produced from the metal nitrite is precipitated. The resulting solution may, if desired, be carefully heated, e. g. to 60° or 70° C., to increase the solubility of the hydroxylamine hydrochloride in the aqueous ethyl alcohol, and may then be freed from the precipitated metal chloride, e. g. by filtration, decantation, centrifuging etc. The warm solution may then be rapidly cooled to atmospheric temperature, and if the concentration of the solution is sufficiently high, part of the hydroxylamine hydrochloride separates as the solution cools. To recover hydroxylamine hydrochloride which is still dissolved in the aqueous ethyl alcohol the solution may be concentrated, preferably by evaporation of the aqueous alcohol under reduced pressure and at a temperature below about 40° C., until the hydroxylamine hydrochloride crystallises out. Any hydroxylamine hydrochloride which may have been precipitated with the metal chloride may be recovered by washing the precipitate with ethyl alcohol; preferably the ethyl alcohol used for the washing is warmed, for instance to 60° or 70° C., and the washings may be cooled rapidly after separation from the metal chloride, thus immediately precipitating part of the hydroxylamine hydrochloride; the remainder may then be recovered by evaporation of the ethyl alcohol, preferably at about atmospheric temperature.

When the hydrogenation is effected in aqueous solution, the hydroxylamine may for example be isolated in the form of its oxalate, which being nearly insoluble in water, is almost completely precipitated from the solution. In this case it is preferable to avoid using more of the relatively strong acid than is needed to liberate the nitrous acid from the nitrite, and to add oxalic acid, or a suitable metal or other oxalate, to the solution in amount at least equivalent to the hydroxylamine formed. The oxalic acid or oxalate may all be added to the solution before the hydrogenation is begun, but preferably it is added continuously or at intervals as the hydrogenation proceeds, so that the amount of oxalic acid or oxalate which up to any given moment has been added to the solution never greatly exceeds the amount needed to combine with the hydroxylamine which has been formed; in other words, the solution preferably always contains a relatively small amount only of free oxalic acid or of the added oxalate. If desired the oxalic acid or metal or other oxalate may be added only after the hydrogenation has been completed, but this is usually less advantageous. The precipitated hydroxylamine oxalate may if desired be converted into hydroxylamine hydrochloride or sulphate by means of a dilute solution of the appropriate acid, and the salt so formed may be further purified by recrystallisation. Hydroxylamine hydrochloride, for example, may be recrystallised from warm ethyl alcohol.

Another useful method of isolating the hydroxylamine makes use of an aldehyde or ketone, which reacts with the hydroxylamine to form an oxime. A useful reagent for this purpose is acetone, which reacts readily with the hydroxylamine to give acetoxime. The acetone or similar reagent may be added before the hydrogenation, or it may be added continuously or at intervals during the hydrogenation, or indeed after the hydrogenation has been completed, though it is preferable to convert the hydroxylamine into the oxime as soon as possible after it is formed. At the end of the reaction the aqueous solution may, if it is still acid, be neutralised, for example with an alkali metal carbonate, and the acetoxime or other oxime removed by a thorough extraction with ether. The oxime may be recovered by evaporating off the ether, and may then be decomposed by means of a dilute acid, for example dilute aqueous hydrochloric or sulphuric acid, to regenerate hydroxylamine and to form the corresponding salt thereof.

The catalyst may be recovered by various methods, depending on the physical state in which it is employed, the conditions under which the hydrogenation is effected, and the method adopted for isolating the hydroxylamine. For example, if the catalyst is employed on a massive carrier, it may easily be removed from the reaction vessel at the end of the reaction, or it may be left in the reaction vessel after the removal of the reaction medium and any solid products. If the catalyst is in a finely divided but not colloidally dispersed form it may be separated with the precipitate of sodium chloride or other metal salt or of hydroxylamine oxalate, according to the particular method by which the hydogenation and isolation are carried out. In the first case, it may be washed free from the metal salt with hot or cold water. In the second case, it may be recovered during the further treatment of the hydroxylamine oxalate; for example if hydroxylamine hydrochloride is formed from the oxalate for purification by recrystallisation as already described, the insoluble residue containing the catalyst may be separated by any suitable means from the solution of the hydroxylamine hydrochloride. Colloidal dispersions of the catalyst metal may be recovered in the mother liquors remaining after sepaartion of the various hydroxylamine compounds.

Having described my invention, what I desire to secure by Letters Patent is:

1. Process for the manufacture of hydroxylamine, which comprises mixing a liquid composition selected from the group which consists of aqueous and aqueous-alcoholic solutions and suspensions of metal nitrites with at least the equivalent amount of an acid stronger than nitrous acid, and subjecting the solution of nitrous acid so obtained to the action of hydrogen under superatmospheric pressure in the presence of a hydrogenation catalyst.

2. Process for the manufacture of hydroxylamine, which comprises mixing a liquid composition selected from the group which consists of aqueous and aqueous-alcoholic solutions and suspensions of metal nitrites with at least the equivalent amount of an acid stronger than nitrous acid, and subjecting the solution of nitrous acid so obtained to the action of hydrogen under superatmospheric pressure in the presence of a hydrogenation catalyst comprising a metal of the platinum group.

3. Process for the manufacture of hydroxylamine which comprises mixing a liquid composition selected from the group which consists of aqueous and aqueous-alcoholic solutions of alkali metal nitrites with at least the equivalent quantity of an acid stronger than nitrous acid, and subjecting the solution of nitrous acid so obtained to the action of hydrogen under superatmospheric pressure in the presence of a hydrogenation catalyst comprising a metal of the platinum group.

4. Process for the manufacture of hydroxylamine which comprises mixing a liquid composition selected from the group which consists of aqueous and aqueous-alcoholic solutions of alkali metal nitrites with at least the eqivalent quantity of an acid stronger than nitrous acid, and subjecting the solution of nitrous acid so obtained to the action of hydrogen under superatmospheric pressure in the presence of a colloidal suspension of a metal of the platinum group.

5. Process for the manufacture of hydroxylamine which comprises mixing a liquid composition selected from the group which consists of aqueous and aqueous-alcoholic solutions of alkali metal nitrites with at least the equivalent quantity of an acid stronger than nitrous acid, and subjecting the solution of nitrous acid so obtained to the action of hydrogen under superatmospheric pressure in the presence of a hydrogenation catalyst comprising a metal of the platinum group deposited on a carrier.

6. Process for the manufacture of hydroxylamine which comprises mixing a liquid composition selected from the group which consists of aqueous and aqueous-alcoholic solutions of alkali metal nitrites with at least the equivalent quantity of an acid stronger than nitrous acid, and subjecting the solution of nitrous acid so obtained at a temperature of 15° to 35° C. to the action of hydrogen under super-atmospheric pressure in the presence of a colloidal suspension of a metal of the platinum group.

7. Process for the manufacture of hydroxylamine which comprises mixing a liquid composition selected from the group which consists of aqueous and aqueous-alcoholic solutions of alkali metal nitrites with at least the equivalent quantity of an acid stronger than nitrous acid, and subjecting the solution of nitrous acid so obtained at a temperature of 15° to 35° C. to the action of hydrogen under super-atmospheric pressure in the presence of a hydrogenation catalyst comprising a metal of the platinum group deposited on a carrier.

8. Process for the manufacture of hydroxylamine which comprises mixing a liquid composition selected from the group which consists of aqueous and aqueous-alcoholic solutions of alkali metal nitrites with at least the equivalent quantity of hydrochloric acid, and subjecting the solution of nitrous acid so obtained at a temperature of 15° to 35° C. to the action of hydrogen under super-atmospheric pressure in the presence of a colloidal suspension of a metal of the platinum group.

9. Process for the manufacture of hydroxylamine which comprises mixing a liquid composition selected from the group which consists of aqueous and aqueous-alcoholic solutions of alkali metal nitrites with at least the equivalent quantity of sulphuric acid, and subjecting the solution of nitrous acid so obtained at a temperature of 15° to 35° C. to the action of hydrogen under super-atmospheric pressure in the presence of a colloidal suspension of a metal of the platinum group.

10. Process for the manufacture of hydroxylamine which comprises mixing a liquid composition selected from the group which consists of aqueous and aqueous-alcoholic solutions of alkali metal nitrites with at least the equivalent quantity of hydrochloric acid, and subjecting the solution of nitrous acid so obtained at a temperature of 15° to 35° C. to the action of hydrogen under super-atmospheric pressure in the presence of a hydrogenation catalyst comprising a metal of the platinum group deposited on a carrier.

11. Process for the manufacture of hydroxylamine which comprises mixing a liquid composition selected from the group which consists of aqueous and aqueous-alcoholic solutions of alkali metal nitrites with at least the equivalent quantity of sulphuric acid, and subjecting the solution of nitrous acid so obtained at a temperature of 15° to 35° C. to the action of hydrogen under super-atmospheric pressure in the presence of a hydrogenation catalyst comprising a metal of the platinum group deposited on a carrier.

HENRY DREYFUS.